Dec. 21, 1965  F. J. LAHER  3,224,524
SCOOTER TYPE VEHICLE WITH COMBINATION
FENDER AND BRAKE THEREFOR
Filed Sept. 19, 1963
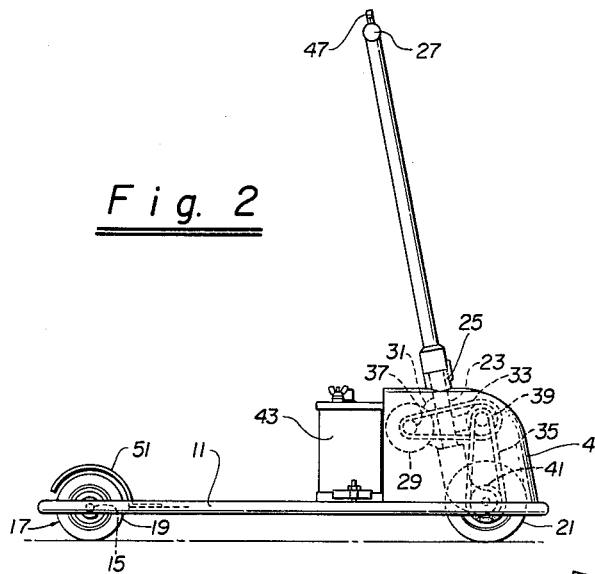
Fig. 2
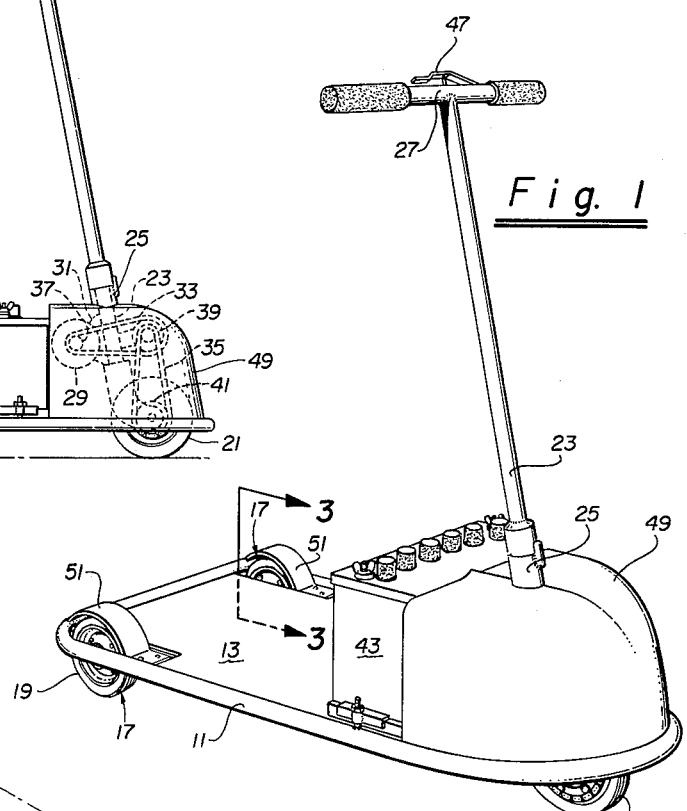
Fig. 1
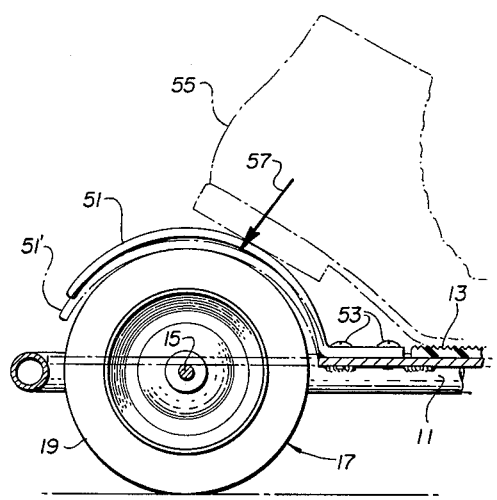
Fig. 4
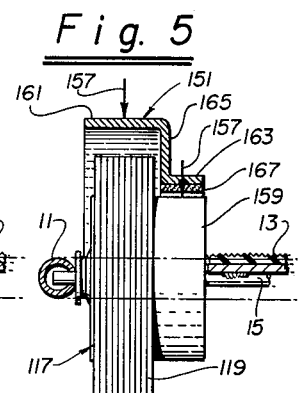
Fig. 3
Fig. 5
INVENTOR.
Frank J. Laher
BY
Attorneys

UNITED STATES PATENT OFFICE 3,224,524
Patented Dec. 21, 1965

3,224,524
SCOOTER TYPE VEHICLE WITH COMBINATION
FENDER AND BRAKE THEREFOR
Frank J. Laher, 120 Camino Sobrante, Orinda, Calif.
Filed Sept. 19, 1963, Ser. No. 309,990
1 Claim. (Cl. 180—26)

This invention relates to scooter type vehicles and more particularly to a combination fender and brake for such vehicles.

In scooter type vehicles economics of manufacture is usually an important factor in the production of a commercially feasible machine. A substantial proportion of the cost of manufacture in prior art scooter vehicles, has been in a relatively complicated and expensive braking system which is frequently the bicycle type including a variation of the normal coaster brake as well as the wheel periphery grip type. In addition to the expense of manufacture of this type of brake, their operation is often subject to malfunction.

It is, therefore, a general object of this invention to provide a scooter type vehicle including an improved brake.

It is a more particular object of this invention to provide a vehicle of the aforementioned character including a combined fender and brake which is simple in manufacture and relatively foolproof in operation.

It is another object of this invention to provide a combination fender and brake of the aforementioned character wherein the fender responds to downward pressure to provide braking action on the wheel therebelow.

These and other features of the invention will become more clearly apparent upon review of the following description in conjunction with the accompanying drawing, in which:

FIGURE 1 is a perspective view of a scooter vehicle including the combined fender and brake, in accordance with this invention;

FIGURE 2 is an elevational view of the scooter shown in FIGURE 1;

FIGURE 3 is a sectional view taken on line 3—3 of FIGURE 1, showing the cooperation of the fender and wheel;

FIGURE 4 is an enlarged elevational view taken on line 4—4 of FIGURE 3; and

FIGURE 5 is a view similar to FIGURE 3 but showing another embodiment of the invention.

Referring to FIGURES 1–4 of the drawings, wherein like elements in each of the figures are designated by like reference numerals, there is shown a scooter including a tubular frame 11 upon which is mounted a platform 13. An axle 15 is connected to the frame 11 near the rear thereof and receives a pair of wheels 17. The wheels may include a tread portion 19 in the form of a tire.

As seen in FIGURES 1 and 2, a front wheel 21 is connected to a steering shaft 23 which in turn is pivotably received by a yoke 25. The yoke 25 is connected to the frame 11 by conventional means not shown in the drawings. A steering handle 27 is affixed to the upper portion of the steering shaft 23 for easy manipulation by the rider.

Motive means for the scooter are provided in the form of an electric motor 29 attached to the steering shaft 23 by means of bracket 31. The output of the motor 29 is supplied to the wheel 21 by means of reduction belting including the belts 33 and 35 together with the sheaves 37, 39 and 41. Power for the motor 29 is supplied from a battery 43 through an accelerator switch 47. Electrical connections and wiring are not shown in the drawings.

A hood 49 serves as a cover for the motor 29 and its associated drive system and serves equally well as a fender for the front wheel 21, to prevent spray from the wheel reaching the rider.

Referring more particularly to FIGURES 3 and 4, but also shown in FIGURES 1 and 2, the combined brake and rear fenders 51 take the form of a tempered steel semicylinder. The fenders 51 are secured to the platform 13 by conventional means such as bolts 53 and are located over the upper portion of the wheels 17.

As is apparent in FIGURES 3 and 4, downward pressure by the operator's foot 55 in the direction of the arrows 57 causes fender 51 to ride along the tread 19 of the wheels 70 as shown by the dashed line position designated 51. Upon release of the pressure the resilient nature of the fender 51 causes it to return to the full-line position as shown, whereby the wheel 17 is free to rotate. Thus, it is apparent that the fender 51 serves not only to prevent spray of wheel 17 from reaching the rider but also serves as an effective and economical brake for the vehicle. While it is preferred that the brake 51 be applied to each of the rear wheels 17 of the vehicle such that either or both feet of the rider may be employed to brake the vehicle, it is apparent that but a single brake may be employed within the scope of this invention.

Referring to FIGURE 5, an alternative embodiment of the combined brake and fender is shown. In this embodiment the wheel 117 includes the tread portion 119 but also a hub portion 159. As clearly seen in the figure, the hub portion 159 has a diameter substantially smaller than the diameter of the tread portion 119. The fender 151 takes the form of a pair of semicylindrical members 161 and 163 joined together by a semiannular flange 165. The concave surface of the semicylindrical portion 163 may be coated with a high friction material 167 such as rubber, neoprene or the like.

Operation of the embodiment shown in FIGURE 5 is substantially similar to that of the embodiment shown in FIGURES 1 to 4 with the exception that downward pressure in the direction of the arrows 157 cause contact between the friction material 167 and the hub 159 rather than with the semicylindrical portion 161 and the tread 119 of the wheel. Thus, in the embodiment shown in FIGURE 5 braking of the vehicle does not cause wear to tread or tire 119.

It is seen that an improved scooter-type vehicle employing a combined fender and brake has been provided. It is further seen that although the combined fender and brake is extremely economical in manufacture, it provides a reliable and foolproof brake for the vehicle.

I claim:

A scooter type vehicle comprising a platform upon which a rider may stand, a plurality of wheels supporting said platform for rolling motion, motive means connected to at least one of said plurality of wheels, a fender having two ends, one of said ends serving to mount the fender to the platform adjacent one of said wheels, said last named wheel including a portion for contact with the ground and a hub portion adjacent to and having a diameter smaller than said portion for contact with the ground, said fender constructed with a portion located about the ground contacting portion of the wheel therebelow and constructed of spring material to provide an upwardly urging resistance to foot pressure applied thereto by the operator of the vehicle, said fender further provided with a semicylindrical portion having a radius of curvature substantially the same as the hub portion of said wheel, said semicylindrical portion being offset laterally from the portion of the fender that is over the ground contacting portion of the wheel whereby direct foot pressure by the rider upon the fender serves to bring the semicylindrical portion of the fender into braking contact with the hub portion of the wheel.

References Cited by the Examiner

UNITED STATES PATENTS

| | | | |
|---|---|---|---|
| 1,050,490 | 1/1913 | Schwarz | 280—11.2 |
| 1,614,822 | 1/1927 | Bukholt | 280—87.04 |
| 1,714,000 | 5/1929 | Davis | 188—2 |
| 2,251,005 | 7/1941 | Rubinich | 188—2 |
| 2,426,451 | 8/1947 | Hammack | 188—2 |
| 3,099,326 | 7/1963 | Weigel et al. | 180—26 |
| 3,100,020 | 8/1963 | Sonntag | 188—2 |

FOREIGN PATENTS

| | | |
|---|---|---|
| 396,141 | 4/1909 | France. |
| 104,585 | 5/1924 | Switzerland. |

BENJAMIN HERSH, *Primary Examiner.*

KENNETH H. BETTS, A. HARRY LEVY, *Examiners.*